US012636619B2

(12) United States Patent
Lu et al.

(10) Patent No.: US 12,636,619 B2
(45) Date of Patent: May 26, 2026

(54) ELECTROLYTIC ELUENT GENERATORS WITH STABILIZED OPERATING VOLTAGES

(71) Applicant: DIONEX CORPORATION, Sunnyvale, CA (US)

(72) Inventors: Zhongqing Lu, Fremont, CA (US); Yan Liu, Palo Alto, CA (US); Christopher A. Pohl, Union City, CA (US); Jinhua Chen, San Jose, CA (US); Jun Cheng, San Jose, CA (US)

(73) Assignee: Dionex Corporation, Sunnyvale, CA (US)

( * ) Notice: Subject to any disclaimer, the term of this patent is extended or adjusted under 35 U.S.C. 154(b) by 86 days.

(21) Appl. No.: 18/520,512

(22) Filed: Nov. 27, 2023

(65) Prior Publication Data

US 2024/0091716 A1 Mar. 21, 2024

Related U.S. Application Data

(60) Division of application No. 18/052,876, filed on Nov. 4, 2022, which is a continuation of application No. 16/716,458, filed on Dec. 16, 2019, now abandoned.

(51) Int. Cl.
| | |
|---|---|
| *B01D 69/02* | (2006.01) |
| *B01D 15/16* | (2006.01) |
| *B01D 61/44* | (2006.01) |
| *G01N 30/96* | (2006.01) |

(52) U.S. Cl.
CPC ............. *B01D 69/02* (2013.01); *B01D 15/16* (2013.01); *B01D 61/44* (2013.01); *G01N 30/96* (2013.01); *G01N 2030/965* (2013.01)

(58) Field of Classification Search
CPC ......... B01D 15/16; B01D 61/44; G01N 30/34
See application file for complete search history.

(56) References Cited

U.S. PATENT DOCUMENTS

| | | | |
|---|---|---|---|
| 5,512,143 | A | 4/1996 | Keating |
| 6,036,921 | A | 3/2000 | Small et al. |
| 6,225,129 | B1 * | 5/2001 | Liu ........................... C25B 1/16 |
| | | | 210/198.2 |
| 6,255,129 | B1 | 7/2001 | Lin |
| 6,315,954 | B1 | 11/2001 | Small et al. |
| 6,316,270 | B1 | 11/2001 | Small et al. |
| 6,316,271 | B1 | 11/2001 | Small et al. |
| 6,682,701 | B1 | 1/2004 | Liu et al. |
| 10,464,058 | B2 | 11/2019 | Hessing et al. |
| 2009/0101582 | A1 | 4/2009 | Liu et al. |
| 2009/0202888 | A1 * | 8/2009 | Kuroda ............... H01M 8/1004 |
| | | | 252/182.1 |
| 2011/0048967 | A1 | 3/2011 | Pettee et al. |
| 2012/0021303 | A1 | 1/2012 | Amendola et al. |
| 2012/0184715 | A1 | 7/2012 | Felgenhauer et al. |
| 2014/0069176 | A1 | 3/2014 | Liu et al. |
| 2014/0332387 | A1 | 11/2014 | Srinivasan et al. |
| 2016/0340789 | A1 | 11/2016 | Schwartz |
| 2017/0199167 | A1 | 7/2017 | Dasgupta et al. |
| 2018/0006917 | A1 | 1/2018 | Swarnamanjunathan et al. |

FOREIGN PATENT DOCUMENTS

| | | | |
|---|---|---|---|
| CN | 106526061 | A * | 3/2017 |
| CN | 108192120 | A | 6/2018 |
| JP | S5499797 | A | 8/1979 |
| JP | S59218952 | A | 12/1984 |
| JP | 2005292105 | A | 10/2005 |
| JP | 2011228158 | A | 11/2011 |

OTHER PUBLICATIONS

Liu et al. "Recent developments in electrolytic devices for ion chromatography" Journal of Biochemical and Biophysical Methods, 2004, vol. 60, pp. 205-232.

* cited by examiner

*Primary Examiner* — Ryan B Huang

(57) ABSTRACT

An electrolytic eluent generator includes an electrolyte reservoir, an eluent generation chamber, and an ion exchange membrane stack. The electrolyte reservoir includes a chamber containing an aqueous electrolyte solution including an electrolyte; and a first electrode. The eluent generation chamber including a second electrode. The ion exchange connector includes an ion exchange membrane stack, and a compression block.

10 Claims, 13 Drawing Sheets

FIG. 3

Prepare Modifying Solution — 402

Treat Membrane Compression Block — 404

Remove Modifying Solution — 406

Wash Membrane Compression Block — 408

Assemble EEG — 410

400

Wash Membrane Compression Block — 502

Treat Membrane Compression Block — 504

Assemble EEG — 506

500

ELECTROLYTIC ELUENT GENERATORS WITH STABILIZED OPERATING VOLTAGES

CROSS-REFERENCE TO RELATED APPLICATIONS

This application is a divisional of U.S. patent application Ser. No. 18/052,876, filed on Nov. 4, 2022. U.S. patent application Ser. No. 18/052,876 is a continuation of U.S. patent application Ser. No. 16/716,458, filed on Dec. 16, 2019, which is hereby incorporated herein by reference in its entirety.

FIELD

The present disclosure generally relates to the field of ion chromatography including electrolytic eluent generators with stabilized operating voltages.

INTRODUCTION

Ion chromatography (IC) is a widely used analytical technique for the determination of anionic and cationic analytes in various sample matrices. Typical separation columns for IC have an internal diameter ranging from about 2 to 4 millimeters and are operated at flow rates ranging from 0.2 to 3 mL/min. In an effort to improve the performance of IC, research has been performed to develop separation columns with smaller diameters. Such smaller columns are typically referred to as a capillary separation column when the internal diameter is about 1 millimeter or less.

In ion chromatography, dilute solutions of acids, bases, or salts are commonly used as chromatographic eluents. Traditionally, these eluents are prepared off-line by dilution with reagent-grade chemicals. Off-line preparation of chromatographic eluents can be tedious and prone to operator errors, and often introduces contaminants. For example, dilute NaOH solutions, widely used as eluents in the ion chromatographic separation of anions, are easily contaminated by carbonate. The preparation of carbonate-free NaOH eluents is difficult because carbonate can be introduced as an impurity from the reagents or by adsorption of carbon dioxide from air. The presence of carbonate in NaOH eluents can compromise the performance of an ion chromatographic method and can cause an undesirable chromatographic baseline drift during the hydroxide gradient and even irreproducible retention times of target analytes. In recent years, several approaches that utilize the electrolysis of water and charge-selective electromigration of ions through ion-exchange media have been investigated by researchers to purify or generate high-purity ion chromatographic eluents. U.S. Pat. Nos. 6,036,921, 6,225,129, 6,316,271, 6,316,270, 6,315,954, and 6,682,701 describe electrolytic devices that can be used to generate high purity acid and base solutions by using water as the carrier. Using these devices, high purity, contaminant-free acid or base solutions are automatically generated on-line for use as eluents in chromatographic separations.

SUMMARY

In a first aspect, an electrolytic eluent generator can include an electrolyte reservoir, an eluent generation chamber, and an ion exchange connector. The electrolyte reservoir can include a chamber containing an aqueous electrolyte solution including an electrolyte and a surfactant and a first electrode. The eluent generation chamber can include a second electrode. The ion exchange connector can include an ion exchange membrane stack and a compression block.

In various embodiments of the first aspect, the eluent generation chamber can be configured to operate at a pressure of up to about 15,000 psi.

In various embodiments of the first aspect, the second electrode can be a perforated cathode.

In various embodiments of the first aspect, the compression block can be disposed between the electrolyte reservoir and the ion exchange membrane stack, and the compression block can include a plurality of channels.

In various embodiments of the first aspect, the surfactant can be (a) an anionic surfactant and the ion exchange membrane stack can have a net negative charge and can be configured to allow cation flow through and to block anions and bulk liquid flow or (b) cationic surfactant and the ion exchange membrane stack can have a net positive charge and can be configured to allow anion flow through and to block cations and bulk liquid flow.

In various embodiments of the first aspect, the surfactant can be a non-ionic surfactant.

In various embodiments of the first aspect, the surfactant can be a caustic and acid stable surfactant.

In a second aspect, a method can include providing an aqueous electrolyte solution to an electrolyte reservoir, the aqueous electrolyte solution including an electrolyte and a surfactant, the electrolyte reservoir coupled to an eluent generation chamber by an ion exchange connector. The ion exchange connector can include an ion exchange membrane stack and a compression block. The method can further include applying a voltage or current across a first electrode in the eluent generation chamber and a second electrode in the electrolyte reservoir; electrolytically splitting water at the first electrode to form a hydroxide anion or a hydronium ion in the eluent generation chamber; and migrating an ion from the electrolyte reservoir through an ion exchange membrane stack to the eluent generation chamber to combine with the hydroxide anion to form a cation hydroxide solution or the hydronium ion to form an anion acid solution for ion chromatography.

In various embodiments of the second aspect, the electrolyte can include a potassium electrolyte.

In various embodiments of the second aspect, the electrolyte can include a methanesulfonate electrolyte.

In various embodiments of the second aspect, the surfactant can be (a) an anionic surfactant and the ion exchange membrane stack can have a net negative charge and can be configured to allow cation flow through and to block anions and bulk liquid flow or (b) cationic surfactant and the ion exchange membrane stack can have a net positive charge and can be configured to allow anion flow through and to block cations and bulk liquid flow.

In various embodiments of the second aspect, the surfactant can be a non-ionic surfactant.

In various embodiments of the second aspect, the surfactant can be a caustic and acid stable surfactant.

In various embodiments of the second aspect, the surfactant can be at a concentration of between about 1 ppm and 100 ppm.

In various embodiments of the second aspect, the eluent generation chamber can be at a pressure of up to about 15,000 psi.

In various embodiments of the second aspect, the current across the anode and the cathode can result in a voltage that remains within a range of not greater than about +/−2.0 V over at least 7 days.

In various embodiments of the second aspect, the current across the anode and the cathode can result in a voltage that varies by not more than 10% of the starting voltage over at least 7 days.

In various embodiments of the second aspect, the compression block can include a plurality of channels and the method can further include generating bubbles in the electrolyte reservoir where the bubbles do not adhere to the plurality of channels.

In a third aspect, an electrolytic eluent generator can include an electrolyte reservoir, an eluent generation chamber, and an ion exchange connector. The electrolyte reservoir can include a chamber containing an aqueous electrolyte solution and a first electrode. The eluent generation chamber can include a second electrode. The ion exchange connector can include an ion exchange membrane stack and a compression block including a surface-modified polymer having a hydrophilic surface.

In various embodiments of the third aspect, the aqueous electrolyte solution can include a potassium electrolyte.

In various embodiments of the third aspect, the aqueous electrolyte solution can include a methanesulfonate electrolyte.

In various embodiments of the third aspect, the surface-modified polymer is a chemically modified polymer. In particular embodiments, the chemically-modified polymer can be chemically modified using sodium borohydride. In particular embodiments, chemically-modified polymer can be modified by converting ketone functional groups to alcohol functional groups. In particular embodiments, the chemically modified polymer can include an alcohol functionalized polyether ether ketone (PEEK-OH).

In various embodiments of the third aspect, the surface-modified polymer can be an oxygen plasma treated polymer. In particular embodiments, the oxygen plasma treated polymer can include alcohol and carbonyl functional groups.

In various embodiments of the third aspect, the eluent generation chamber is configured to operate at a pressure of up to about 15,000 psi.

In various embodiments of the third aspect, the second electrode can be a perforated cathode.

In various embodiments of the third aspect, the compression block can be disposed between the electrolyte reservoir and the ion exchange membrane stack, and the compression block can include a plurality of channels.

In a fourth aspect, a method can include providing an aqueous electrolyte solution to an electrolyte reservoir, the electrolyte reservoir coupled to an eluent generation chamber by an ion exchange connector. The ion exchange connector can include an ion exchange membrane stack and a compression block. The compression block can include a surface-modified polymer having a hydrophilic surface. The method can further include applying a current or voltage across a first electrode in the eluent generation chamber and a second electrode in the electrolyte reservoir; electrolytically splitting water at the cathode to form a hydroxide anion or a hydronium ion in the eluent generation chamber; and migrating an ion from the electrolyte reservoir through the ion exchange membrane stack to the eluent generation chamber to combine with the hydroxide anion to form a cation hydroxide solution or the hydronium ion to form a anion acid solution for ion chromatography.

In various embodiments of the fourth aspect, the aqueous electrolyte solution can include a potassium electrolyte.

In various embodiments of the fourth aspect, the aqueous electrolyte solution can include a methanesulfonate electrolyte.

In various embodiments of the fourth aspect, the surface-modified polymer can be a chemically modified polymer. In particular embodiments, the chemically-modified polymer can be chemically modified using sodium borohydride. In particular embodiments, the chemically-modified polymer can be modified by converting ketone functional groups to alcohol functional groups. In particular embodiments, the chemically modified polymer can include an alcohol functionalized polyether ether ketone (PEEK-OH).

In various embodiments of the fourth aspect, the surface-modified polymer can be an oxygen plasma treated polymer. In particular embodiments, the oxygen plasma treated polymer can include alcohol and carbonyl functional groups.

In various embodiments of the fourth aspect, the eluent generation chamber is at a pressure of up to about 15,000 psi.

In various embodiments of the fourth aspect, the current across the anode and the cathode can result in a voltage that remains within a range of not greater than about +/−2.0 V over at least 7 days.

In various embodiments of the fourth aspect, the current across the anode and the cathode can result in a voltage that varies by not more than 10% of the starting voltage over at least 7 days.

In various embodiments of the fourth aspect, the compression block can include a plurality of channels and the method can further include generating bubbles in the electrolyte reservoir where the bubbles do not adhere to the plurality of channels.

DRAWINGS

For a more complete understanding of the principles disclosed herein, and the advantages thereof, reference is now made to the following descriptions taken in conjunction with the accompanying drawings, in which:

FIG. 3 illustrates the chemical modification of PEEK, in accordance with various embodiments.

Figure 1:
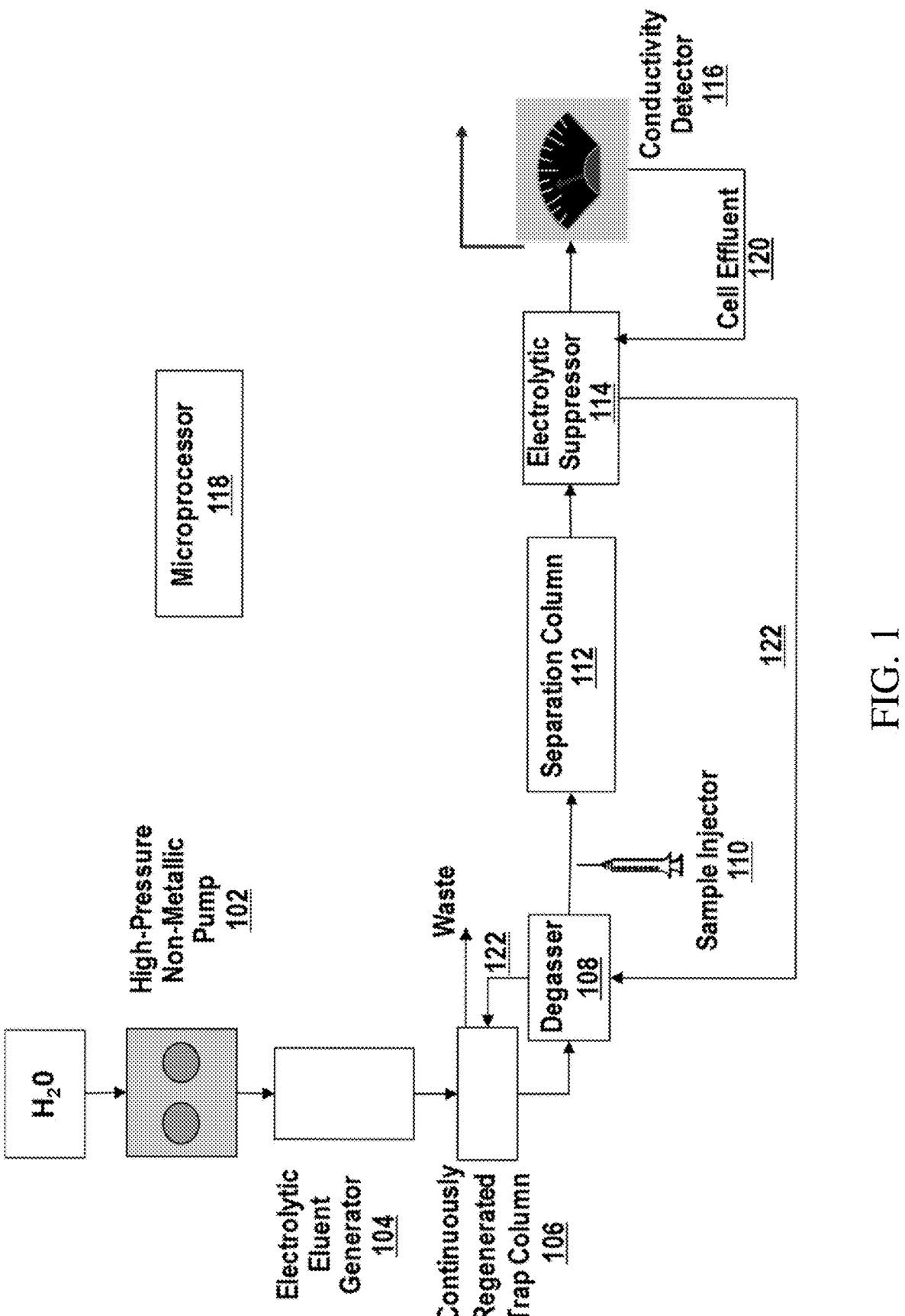
FIG. 1 illustrates a chromatography system that includes an eluent generator, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ion separation are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Chromatography System

FIG. 1 illustrates an embodiment of a chromatography system 100. Chromatography system 100 may include a pump 102, an electrolytic eluent generator 104, a continuously regenerated trap column 106, a degasser 108, a sample injector 110, a chromatographic separation device 112, an electrolytic suppressor 114, a detector 116, and a microprocessor 118. Chromatographic separation device 112 may be in the form of a capillary column or an analytical column. A recycle line 120 may be used to transfer the liquid from an output of detector 116 to an inlet of the electrolytic suppressor 114, recycle line 122 may be used to transfer liquid from an outlet of electrolytic suppressor 114 to an inlet of degasser 108, and recycle line 124 may be used to transfer liquid from an outlet of degasser 108 to an inlet of continuously regenerated trap column 106.

Pump 102 can be configured to pump a liquid from a liquid source 124 and be fluidically connected to electrolytic eluent generator 104. In an embodiment, the liquid may be deionized water, an aqueous solution with electrolyte(s), or a mixture of an organic solvent with deionized water or with aqueous electrolyte(s) solution. A few example electrolytes are sodium acetate and acetic acid. The eluent mixture that contains an organic solvent may include a water miscible organic solvent such as, for example, methanol. Pump 102 can be configured to transport the liquid at a pressure ranging from about 20 PSI to about 15,000 PSI. Under certain circumstances, pressures greater than 15,000 PSI may also be implemented. It should be noted that the pressures denoted herein are listed relative to an ambient pressure (13.7 PSI to 15.2 PSI). Pump 102 may be in the form of a high-pressure liquid chromatography (HPLC) pump. In addition, pump 102 can also be configured so that the liquid only touches an inert portion of pump 102 so that a significant amount of impurities does not leach out. In this context, significant means an amount of impurities that would interfere with the intended measurement. For example, the inert portion can be made of polyetherether ketone (PEEK) or at least coated with a PEEK lining, which does not leach out a significant amount of ions when exposed to a liquid.

An eluent is a liquid that contains an acid, base, salt, or mixture thereof and can be used to elute an analyte through a chromatography column. In addition, an eluent can include a mixture of a liquid and a water miscible organic solvent, where the liquid may include an acid, base, salt, or combination thereof. Electrolytic eluent generator 104 is configured to generate a generant. A generant refers to a particular species of acid, base, or salt that can be added to the eluent. In an embodiment, the generant may be a base such as cation hydroxide or the generant may be an acid such as carbonic acid, phosphoric acid, acetic acid, methanesulfonic acid, or a combination thereof.

Referring to FIG. 1, eluent generator 104 can be configured to receive the liquid from pump 102 and then add a generant to the liquid. The liquid containing the generant can be outputted from eluent generator 104 to an inlet of continuously regenerated trap column 106.

Continuously regenerated trap column 106 is configured to remove cationic or anionic contaminants from the eluent. Continuously regenerated trap column 106 can include an ion exchange bed with an electrode at the eluent outlet. An ion exchange membrane interface can separate the eluent from a second electrode and contaminate ions can be swept through the ion exchange membrane towards the second electrode. In various embodiments, anion removal can utilize an anion exchange bed with a cathode at the eluent outlet separated from an anode by an anion exchange membrane. Alternatively, cation removal can utilize a cation exchange bed with an anode at the eluent outlet separated from a cathode by a cation exchange membrane. The contaminate ions can be swept out of regenerated trap column 106 using a recycled liquid via a recycle line 124 that is downstream of degas assembly 108.

Degasser 108 may be used to remove residual gas. In an embodiment, a residual gas may be hydrogen and oxygen. Degasser 108 may include a tubing section that is gas permeable and liquid impermeable such as, for example, amorphous fluoropolymers or more specifically Teflon AF. The flowing liquid can be outputted from degasser 108 to sample injector 110 with a substantial portion of the gas removed. The gas can be swept out of degasser 108 using a recycled liquid via a recycle line 122 that is downstream of electrolytic suppressor 114. The recycled liquid containing the residual gas can also be outputted from degasser 108 and directed to the continuously regenerated trap column 106.

Sample Injector 110 can be used to inject a bolus of a liquid sample into an eluent stream. The liquid sample may include a plurality of chemical constituents (i.e., matrix components) and one or more analytes of interest.

Chromatographic separation device 112 can be used to separate various matrix components present in the liquid sample from the analyte(s) of interest. Typically, chromatographic separation device 112 may be in the form of a hollow cylinder that contains a packed stationary phase. As the liquid sample flows through chromatographic separation device 112, the matrix components and target analytes can have a range of retention times for eluting off of chromatographic separation device 112. Depending on the characteristics of the target analytes and matrix components, they can have different affinities to the stationary phase in chromatographic separation device 112. An output of chromatographic separation device 112 can be fluidically connected to electrolytic suppressor 114.

Electrolytic suppressor 114 can be used to reduce eluent conductivity background and enhance analyte response through efficient exchange of eluent counterions for regenerant ions. Electrolytic suppressor 114 can include an anode chamber, a cathode chamber, and an eluent suppression bed chamber separated by ion exchange membranes. The anode chamber and/or cathode chamber can produce regenerate ions. The eluent suppression bed chamber can include a flow path for the eluent separated from the regenerant by an ion exchange barrier and eluent counterions can be exchanged with regenerate ions across the ion exchange barrier. The cathode chamber or anode chamber can be supplied a recycled liquid via a recycle line 120 that is downstream of conductivity detector 116. An output of electrolytic suppressor 114 can be fluidically connected to detector 116 to measure the presence of the separated chemical constituents of the liquid sample.

As illustrated in FIG. 1, the fluidic output of the eluent from detector 116 is recycled to electrolytic suppressor 114 via recycle line 120, the fluidic output of the electrolytic suppressor 114 is recycled to degasser 108 via recycle line 122, the fluidic output from degasser 108 is recycled to continuously regenerated trap column 106 via recycle line 124, and the fluidic output of the continuously regenerated trap column 106 flows to waste.

Detector 116 may be in the form of ultraviolet-visible spectrometer, a fluorescence spectrometer, an electrochemical detector, a conductometric detector, a charge detector, or a combination thereof. Details regarding the charge detector that is based on a charged barrier and two electrodes can be found in US Pre-Grant Publication No. 20090218238, which is hereby fully incorporated by reference herein. For the situation where recycle line 120 is not needed, detector 116 may also be in the form of a mass spectrometer or a charged aerosol detector. The charged aerosol detector nebulizes the effluent flow and creates charged particles that can be measured as a current proportional to the analyte concentration. Details regarding the charged aerosol detector can be found in U.S. Pat. Nos. 6,544,484; and 6,568,245, which are hereby fully incorporated by reference herein.

An electronic circuit may include microprocessor 118, a timer, and a memory portion. In addition, the electronic circuit may include a power supply that are configured to apply a controlling signal, respectively. Microprocessor 118 can be used to control the operation of chromatography system 100. Microprocessor 118 may either be integrated into chromatography system 100 or be part of a personal computer that communicates with chromatography system 100. Microprocessor 118 may be configured to communicate with and control one or more components of chromatography system such as pump 102, eluent generator 104, sample injector 110, and detector 116. The memory portion may be used to store instructions to set the magnitude and timing of the current waveform with respect to the switching of sample injector 110 that injects the sample.

Figure 2A:
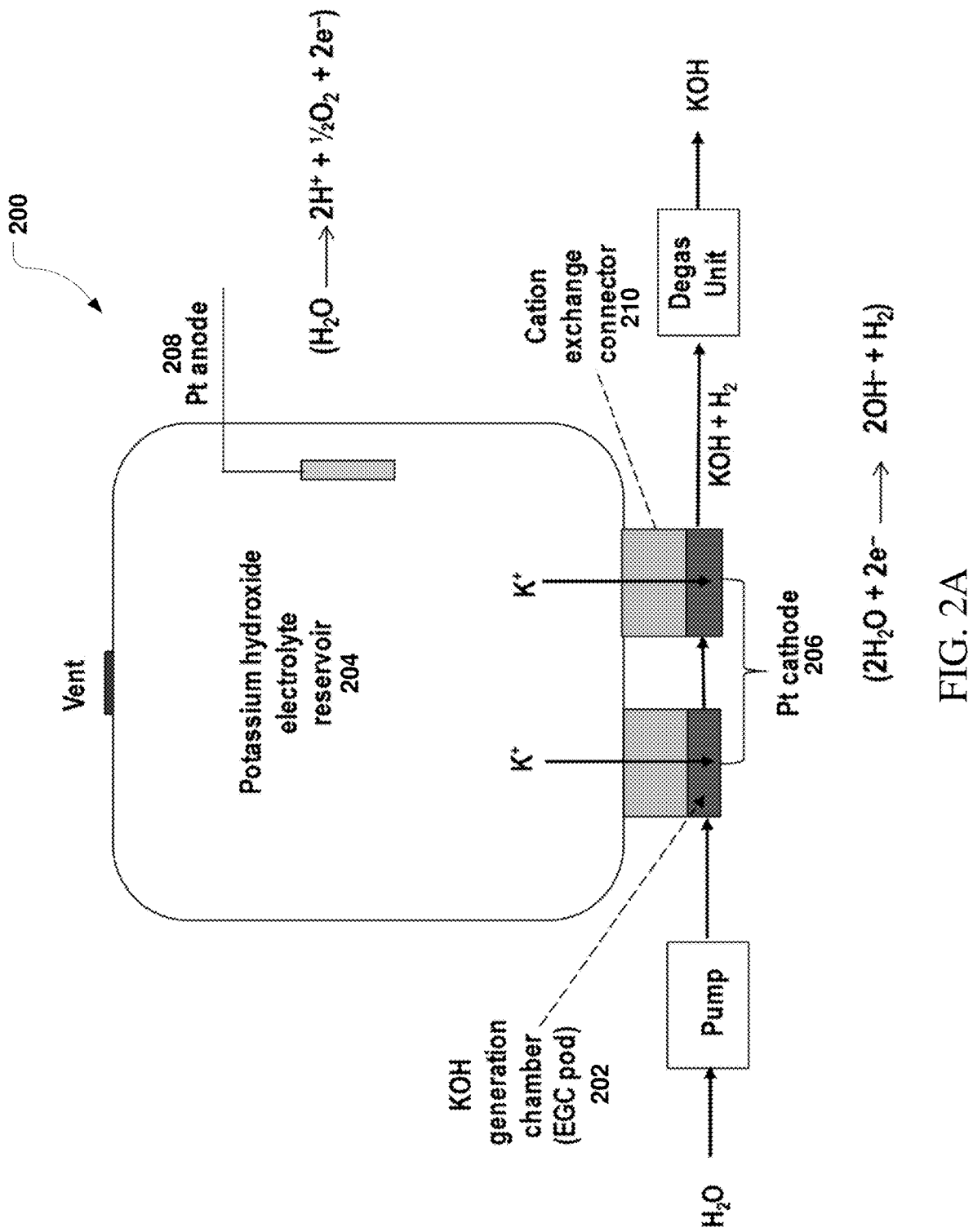
FIGS. 2A and 2B illustrate an eluent generator, in accordance with various embodiments.

FIG. 2A illustrates the operation principle of an electrolytic generator cartridge 200. The cartridge can include a high-pressure eluent generation chamber 202 and a low-pressure electrolyte reservoir 204. In various embodiments, the high-pressure generation chamber 202 can operate at a pressure of up to about 15,000 psi, such as between about 2000 psi and about 10,000 psi.

The eluent generation chamber 202 can contain a perforated platinum (Pt) electrode 206. The electrolyte reservoir 204 can contain a Pt electrode 208 and an electrolyte solution. In various embodiments, the electrolytic generator cartridge 200 can produce a base, such as KOH, electrode 206 can be a cathode where hydroxide ions can be formed, and electrode 208 can be an anode. In other embodiments, the electrolytic generate cartridge 200 can produce an acid, such as carbonic acid, phosphoric acid, acetic acid, methanesulfonic acid, electrode 206 can be an anode where hydronium ions can be formed, and electrode 208 can be a cathode. The eluent generation chamber 202 can be connected to the electrolyte reservoir 204 by means of a exchange connector 210 which can permit the passage of ions of only one charge from the electrolyte reservoir 204 into the high-pressure generation chamber 202. The exchange connector 210 can also serve the critical role of a high-pressure physical barrier between the low-pressure electrolyte reservoir 204 and the high-pressure generation chamber 202. In various embodiments, where the electrolytic generator cartridge 200 is a base generator, the exchange connector 210 can permit the passage of cations while substantially preventing the passage of anions from the electrolyte reservoir 204 into the generation chamber 202. In alternate embodiments where the electrolytic generator cartridge 200 is an acid generator, the exchange connector 210 can permit the passage of anions while substantially preventing the passage of cations from the electrolyte reservoir 204 into the generation chamber 202.

To generate a KOH eluent, deionized water can be pumped through the eluent generation chamber 202 and a DC current can be applied between the electrode 208 and electrode 206. Under the applied electric field, the electrolysis of water can occur at both the electrode 208 and electrode 206 of the device 200. Water can be oxidized to form H+ ions and oxygen gas at electrode 208 in the electrolyte reservoir 204: H2O→2H++½ O2↑+2e−. Water can be reduced to form OH− ions and hydrogen gas at electrode 206 in the KOH generation chamber 202: 2H2O+2e−→2 OH−+ H2↑. As H+ ions, generated at the anode 206, displaces K⁺ ions in the electrolyte reservoir 204, the displaced ions can migrate across the cation exchange connector 210 into the eluent generation chamber 202. These K⁺ ions can combine with hydroxide ions generated at the cathode 206 to produce the KOH solution, which can be used as the eluent for anion exchange chromatography. The concentration of generated KOH can be determined by the current applied to the generator cartridge 200 and the carrier water flow rate through the generation chamber 202.

To generate a methanesulfonic acid eluent, deionized water can be pumped through the eluent generation chamber 202 and a DC current can be applied between the electrode 208 and electrode 206. Under the applied field, the electrolysis of water can occur at both the electrode 208 and electrode 206 of the device 200. Water can be oxidized to form H+ ions and oxygen gas at the electrode 206 in the KOH generation chamber 202: H2O→2H++½ O2↑+2e−. Water can be reduced to form OH− ions and hydrogen gas at the electrode 208 in the electrolyte reservoir 204: 2H2O+ 2e−→2 OH−+H2↑. As OH⁻ ions, generated at the electrode 206, displaces methanesulfonate ions in the electrolyte reservoir 204, the displaced ions can migrate across the anion exchange connector 210 into the eluent generation chamber 202. These methanesulfonate ions can combine with hydronium ions generated at the electrode 206 to produce the methanesulfonic acid solution, which can be used as the eluent for cation exchange chromatography. The concentration of generated methanesulfonic acid can be determined by the current applied to the generator cartridge 200 and the carrier water flow rate through the generation chamber 202.

Figure 2B:
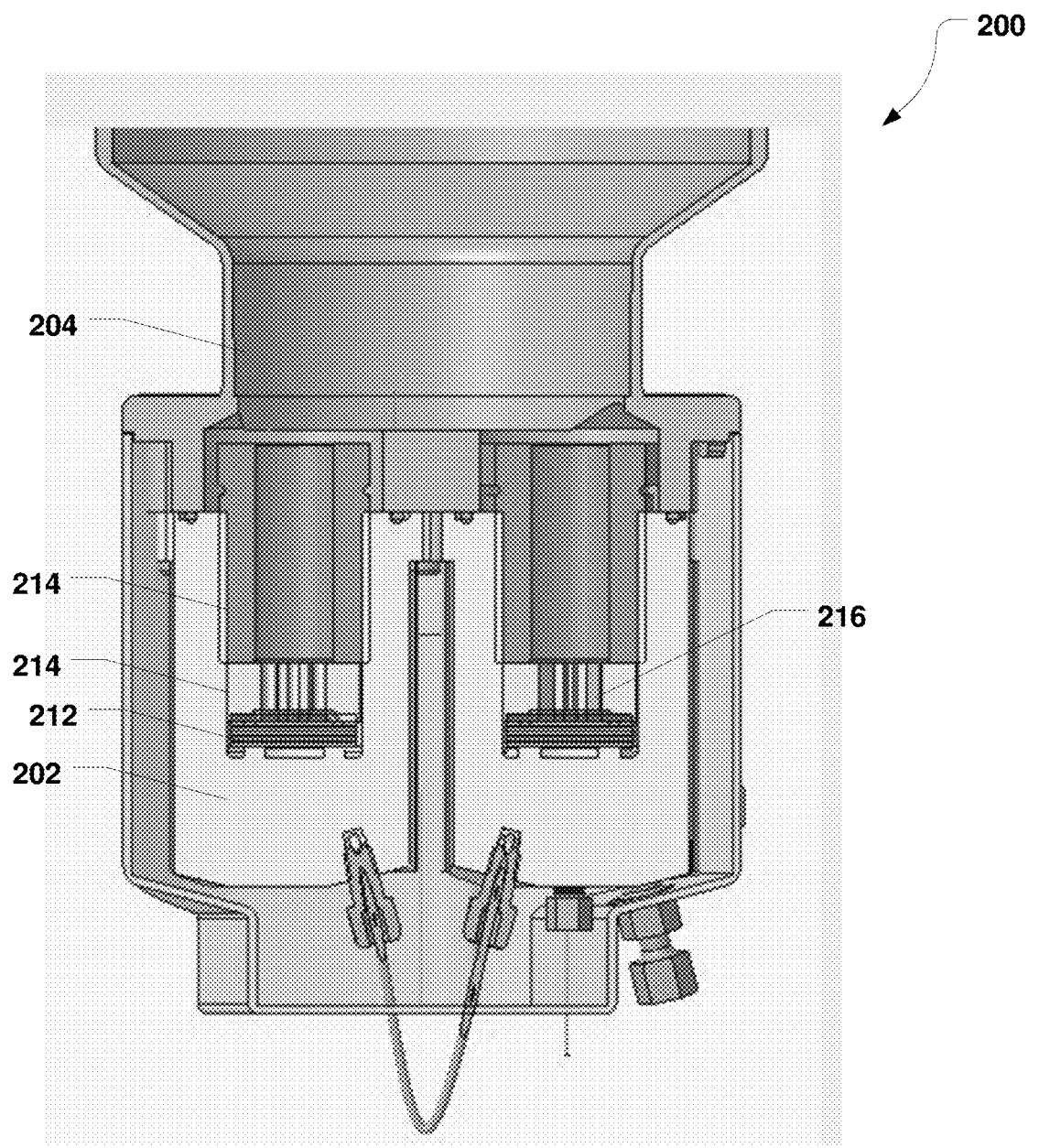

FIG. 2B shows a cross-sectional view of an electrolytic generator 200. A stack of ion exchange membranes 212 is supported by a PEEK compression block 214 so that the generation chamber 202 is capable of withstanding high pressure. In various embodiments, the PEEK compression block 214 can be perforated with opened vertical channels which can be typically cylindrical. The electrolyte solution in the low-pressure electrolyte reservoir 204 is in direct contact with ion exchange membrane stack 212 through the opened vertical channels 216 of the PEEK membrane compression block 214.

During the operation of an electrolytic generator 202, oxygen gas can be generated at the anode located in the electrolyte reservoir 204. Most of the oxygen gas rises and dissipates through from the vent port of low-pressure electrolyte reservoir 204. However, some oxygen gas can dissolve in the alkaline solution and can aggregate to form gas bubbles. These oxygen gas bubbles can adhere to hydrophobic surface of the low-pressure electrolyte reservoir 204 and the PEEK membrane compression block 214, and some of gas bubbles may settle and block the opened vertical channels 216 of the PEEK membrane compression block 214.

If the opened vertical channels of the PEEK membrane compression block 214 are blocked by the oxygen gas bubbles, the contact between the electrolyte solution in the low-pressure electrolyte reservoir 204 and the ion exchange membrane stack 212 can be reduced or lost. Thus, the migration of ions in the electrolyte reservoir 204 across the cation exchange membrane stack 212 into the eluent generation chamber 202 can be restricted as a result, leading to an increase in the operating voltage of the electrolytic generator 200. The higher operating voltage can lead to higher operating wattage and potentially excessive amount of heat generated during the operation of an electrolytic generator 202. The excessive amount of heat may lead to the damage of ion exchange membranes 212 and can be detrimental to the reliable operation of an electrolytic eluent generator 202. There is a need to develop new embodiments of electrolytic eluent generators that can avoid the impact of gas bubbles that may adhere to the hydrophobic surface of the low-pressure electrolyte reservoir 204 and the opened vertical channels 216 of the PEEK membrane compression block 214.

The gas bubbles in an aqueous solution have tendency to adhere on the solid surface such as the surface of the low-pressure electrolyte reservoir 204 and the PEEK membrane compression block 214. The contact angel of a gas bubble on a solid surface depends on the hydrophobicity of the solid surface. The contact angle of a gas bubble can be typically less than 90° on a hydrophilic surface and the contact angle of a gas bubble can be typically larger than 90° on a hydrophobic surface. The amounts and sizes of gas bubbles adhered to a hydrophilic surface in an aqueous solution can be significantly reduced when compared to a hydrophobic surface in an aqueous solution.

Chemical Modifcation

Embodiments of electrolytic eluent generators constructed using high strength polymeric parts where the surfaces are modified to be hydrophilic to reduce and minimize the amounts and sizes of oxygen gas bubbles adhered to the surface of the low-pressure electrolyte reservoir and the PEEK membrane compression block are described. The surface modified electrolytic eluent generators can eliminate the blocking of the opened vertical channels of the PEEK membrane compression block, can maintain the continuous fluid contact between the electrolyte solution in the low-pressure electrolyte reservoir and the ion exchange membrane stack, and thus can provide the stabilization of operating voltage and improved operation reliability of the electrolytic KOH generators.

Figure 3:
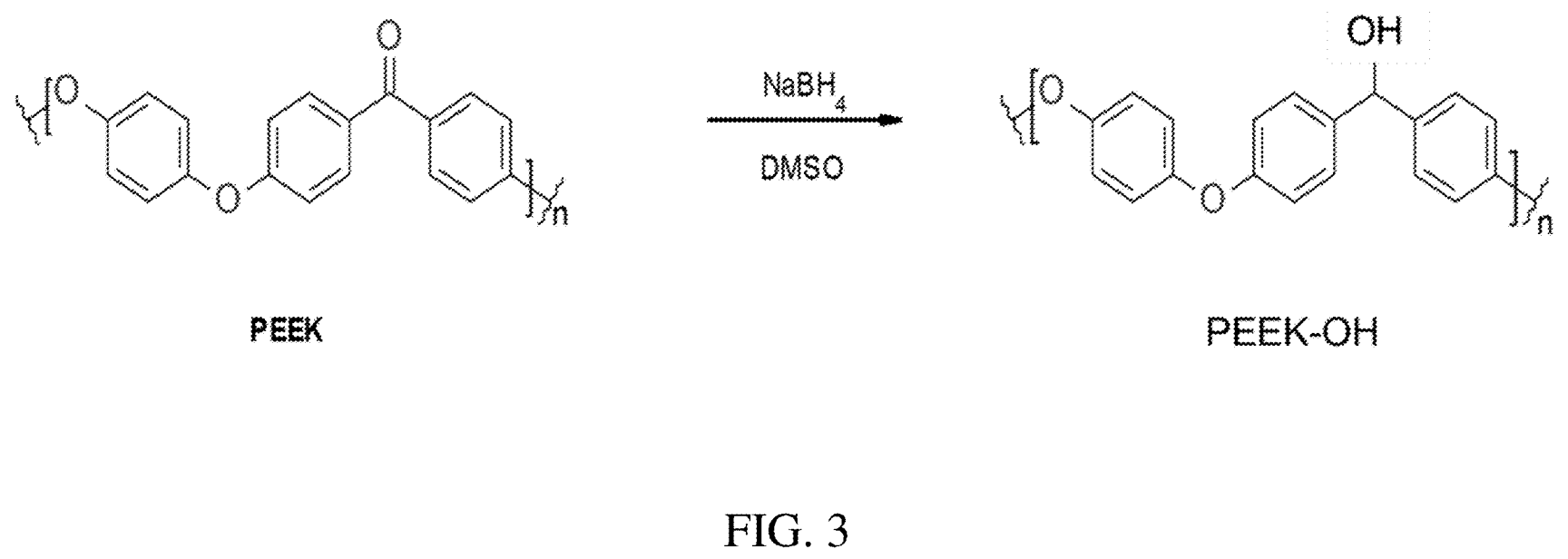

The hydrophobic surface of the PEEK membrane compression block can be modified chemically into the hydrophilic surface by conversion of PEEK ketone functional groups into alcohol functional groups (PEEK-OH) using sodium borohydride in dimethyl sulfoxide (DMSO) as shown in FIG. 3.

Figure 4:
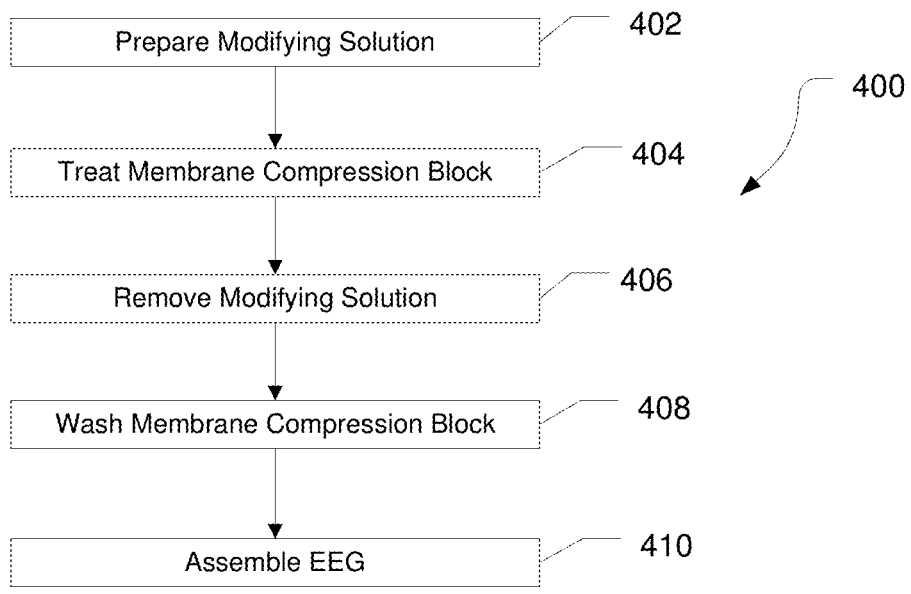
FIGS. 4 and 5 illustrate methods of chemically modifying a membrane compression block of an eluent generator, in accordance with various embodiments.

FIG. 4 illustrates a method 400 of chemically modifying the PEEK membrane compression block. At 402, the modifying solution can be prepared. For example, sodium borohydride and dimethyl sulfoxide can be added to a flask with a magnetic bar stirring and the atmosphere of argon blanket was applied. The flask can be heated in an oil bath, such as at 120° C. After sodium borohydride was completely dissolved, the PEEK membrane compression block can be treated, as indicated at 404. For example, the parts can be added to the flask. In various embodiments, reacting the parts with the modifying solution can continue for 4 or more hours. At 406, the parts can be removed from the modifying solution, and at 408, the parts can be washed. For example, after being cooled to room temperature, the DMSO solution can be discarded and the PEEK parts can be washed twice with isopropyl alcohol and three times with acetone, respectively. After washing the parts, the electrolytic KOH eluent generator cartridges can be assembled, as indicated at 410.

Figure 5:
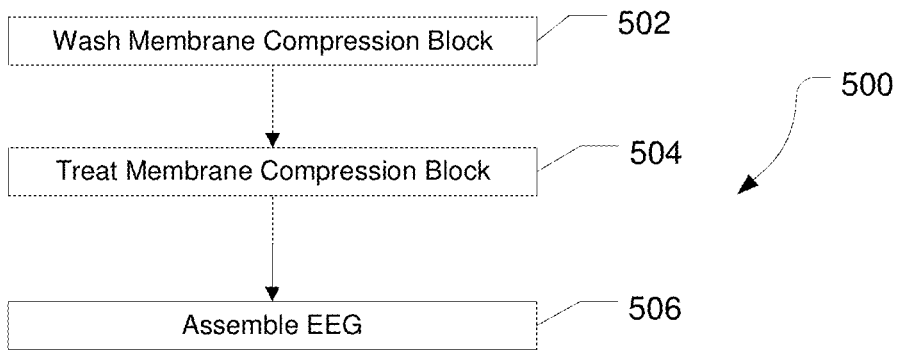

FIG. 5 illustrates a method 500 of modifying the hydrophobic surface of the PEEK membrane compression block using an oxygen plasma treatment to form the hydrophilic surface including alcohol and carbonyl functional groups on the PEEK surfaces. At 502, the PEEK membrane compression block parts can be washed. For example, the PEEK membrane compression block parts can be rinsed thoroughly with DI $H_2O$, followed by overnight oven drying. At 504, the parts can be treated. For example, the parts can be placed in the plasma chamber of a plasma cleaner/sterilizer for oxygen plasma treatment. In various embodiments, the oxygen plasma treatment can be performed with high levels of oxygen plasma for 60 minutes at a time, with the plasma treatment repeated three times. At 506, the oxygen plasma treated parts can be used to assemble electrolytic KOH eluent generator cartridges.

Figure 6:
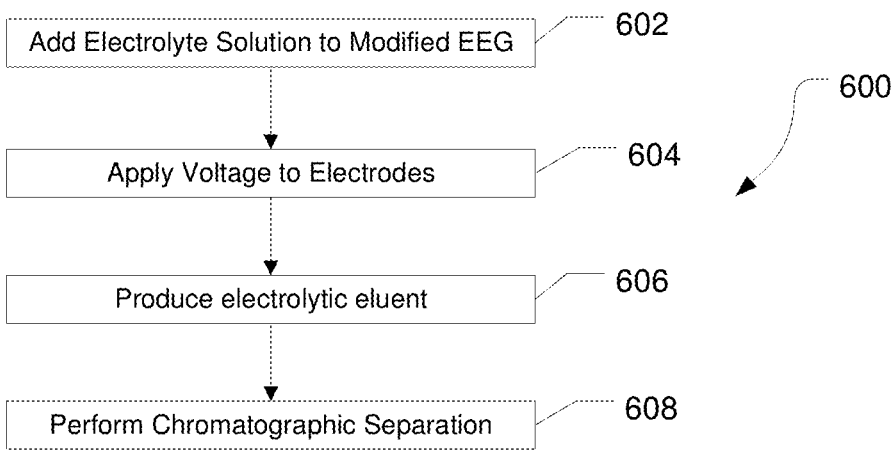
FIG. 6 illustrates a method of operating a chemically modified eluent generator, in accordance with various embodiments.

FIG. 6 illustrates a method 600 of operating a chemically modified electrolytic eluent generator. At 602, the electrolytic eluent generator can be prepared with an electrolyte solution, such as a $K^+$ ion electrolyte solution. At 604, a voltage can be applied to the electrolytic eluent generator, and at 606, the electrolytic eluent generator can produce the electrolytic eluent. In various embodiments, the current across the anode and the cathode results in a voltage that remains within a range of about +/−2.0 V over a period of at least 7 days, such as a range of about +/−1.0 V, even a range of about +/−0.5 V. In various embodiments, the current across the anode and the cathode results in a voltage that varies by not more than about 10% of the starting voltage over at least 7 days. At 608, the electrolytic eluent can be used to perform a chromatographic separation.

Surfactants

In another preferred embodiment of the electrolytic eluent generator, surfactants containing ionic or hydrophilic functional groups can be used to coat the PEEK surface to reduce and minimize the amounts and sizes of oxygen gas bubbles adhered to the surface of the low-pressure electrolyte reservoir and the PEEK membrane compression block. In this embodiment, a small amount of surfactant can be added into the electrolyte solution. The surfactants should be chemical stable in the electrolyte solution and cannot migrate across the ion exchange membrane stack under the applied electric field.

In various embodiments, the surfactant can be an ionic surfactant or a non-ionic surfactant. In particular embodiments, the ionic surfactant can be an anionic surfactant when used in a base generator, such as for production of KOH. Alternatively, a cationic surfactant can be an appropriate ionic surfactant for use in an acid generator, such as for the production of methanesulfonic acid. Additionally, the surfactant can be stable in a caustic or acidic solution.

In various embodiments, the surfactant can be at a concentration between about 1 ppm and about 100 ppm.

Figure 7:
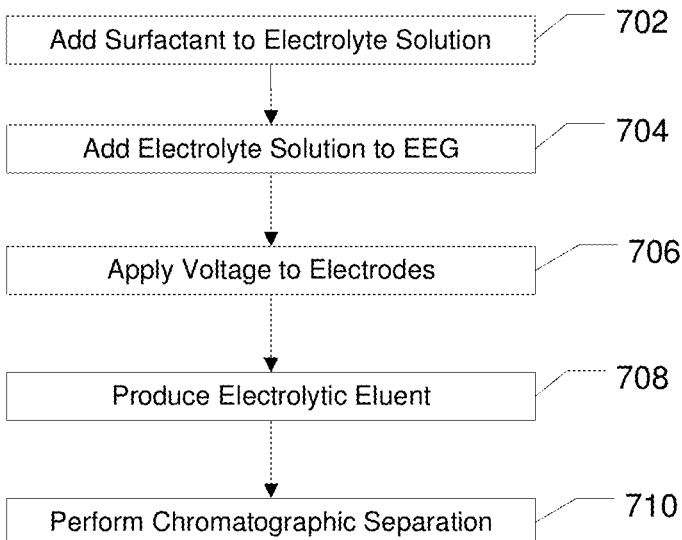
FIG. 7 illustrates a method of operating an eluent generator using a surfactant, in accordance with various embodiments.

FIG. 7 illustrates a method 700 of operating an electrolytic eluent generator with a surfactant. At 702, the surfactant can be added to the electrolyte solution, and at 704, the electrolytic eluent generator can be prepared with the electrolyte solution, such as a $K^+$ ion electrolyte solution. For example, an electrolyte solution can be spiked with a non-ionic surfactant, such as TERGITOL MIN Foam. In another example, when the eluent is a base, the electrolyte solution can be spiked with an anionic surfactant, such as TRITON H55, and the ion exchange membrane stack can have a net negative charge and can be configured to allow cation flow through and to block anions and bulk liquid flow. In yet another example, when the eluent is an acid, the electrolyte solution can be spiked with a cationic surfactant and the ion exchange membrane stack can have a net positive charge and is configured to allow anion flow through and to block cations and bulk liquid flow. Advantageously, the ion exchange membrane stack can prevent the surfactant from contaminating the eluent. At 706, a voltage can be applied to the electrolytic eluent generator, and at 708, the electrolytic eluent generator can produce the electrolytic eluent. In various embodiments, the current across the anode and the cathode results in a voltage that remains within a range of about +/−2.0 V over a period of at least 7 days, such as a range of about +/−1.0 V. In various embodiments, the current across the anode and the cathode results in a voltage that varies by not more than about 10% of the starting voltage over at least 7 days. At 710, the electrolytic eluent can be used to perform a chromatographic separation.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

Results

Figure 8:
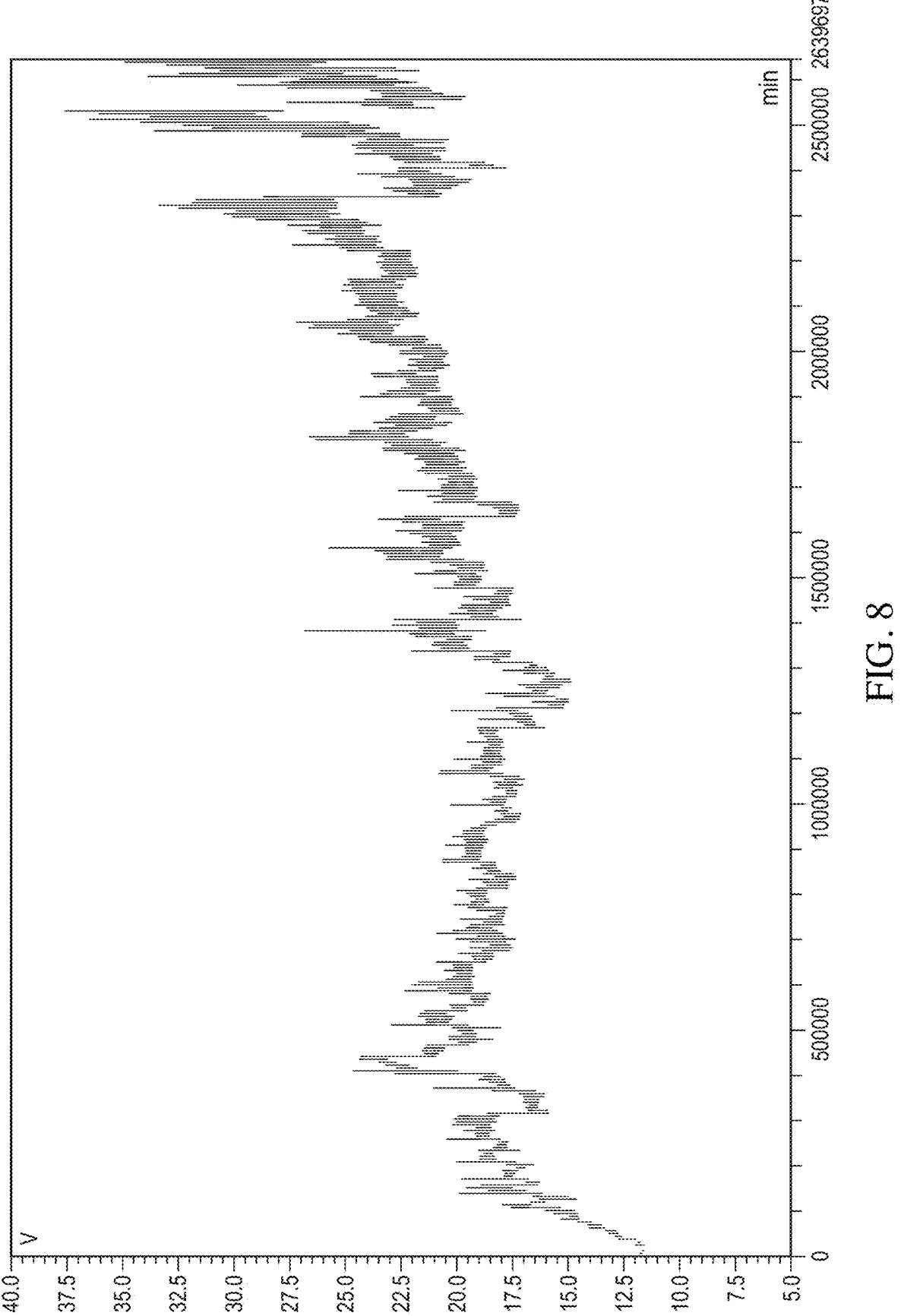
FIG. 8 illustrates the operating voltage profile for an unmodified electrolytic KOH generator.

FIG. 8 shows an example of the operating voltage profile for an unmodified electrolytic KOH generator under the conditions of 1.5 mL/min, 60 mM KOH, and 4150 psi. The cartridge operating voltage remains relatively stable within one day of continuous operation. However, afterwards the cartridge operating voltage starts to climb from about 12 V to over 35 V, leading excessive amount of heat generated during the operation of the electrolytic KOH eluent generator.

Figure 9:
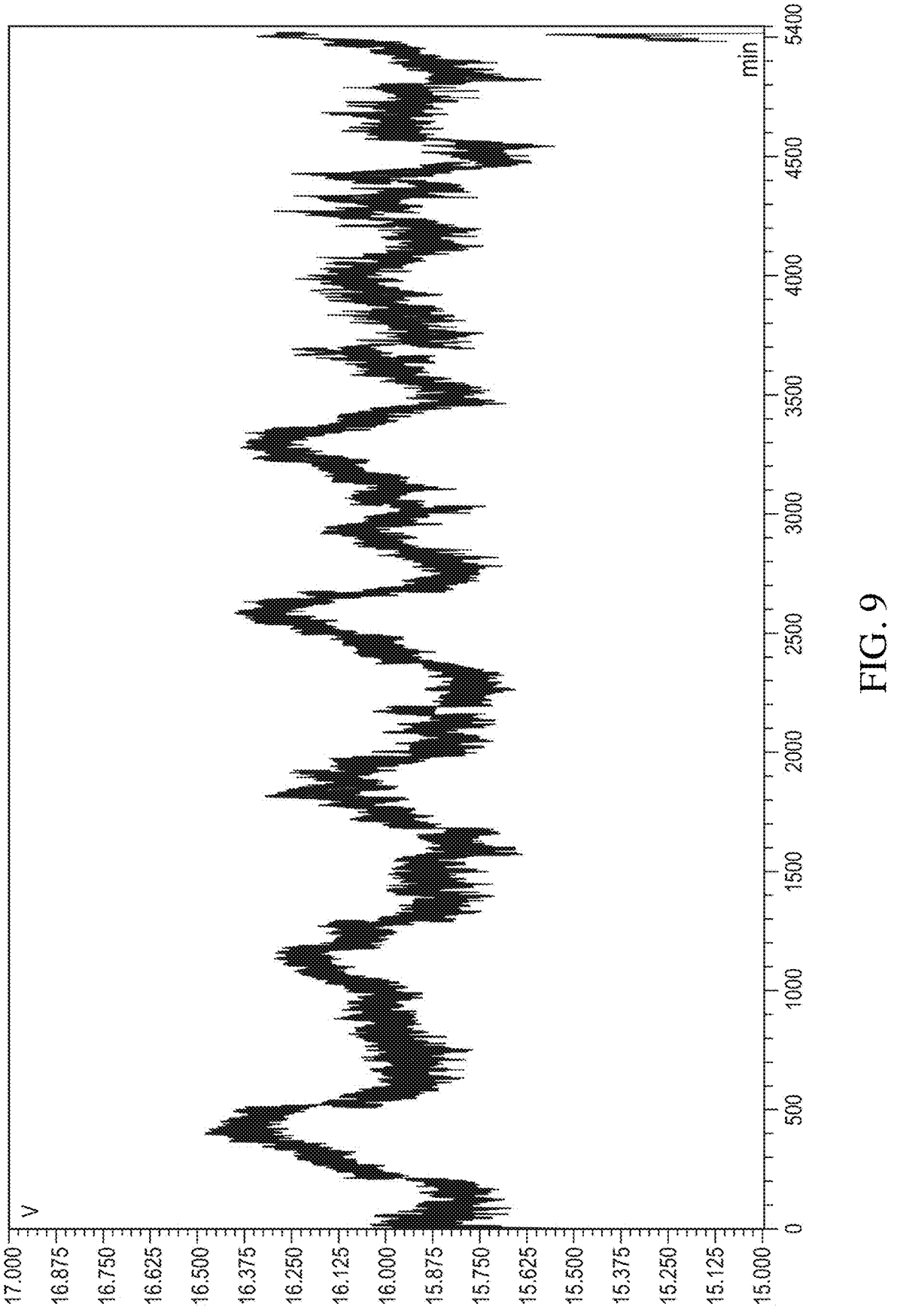
FIG. 9 illustrates the operating voltage profile for an electrolytic KOH generator with PEEK membrane compression block parts modified using sodium borohydride in dimethyl sulfoxide (DMSO).

FIG. 9 shows a typical operation voltage profile obtained for an electrolytic KOH eluent generator using the PEEK membrane compression block parts modified by conversion of PEEK ketone functional groups into alcohol functional groups using sodium borohydride in dimethyl sulfoxide (DMSO). Under the conditions of 1.5 mL/min, 60 mM KOH, 3550 psi, the device operating voltage is stable, ranging from 15.7 V to 16.5 V during 7 days of continuous operation. That is, the voltage varies within a range of about +/−0.5 V and less than 10% of the starting voltage.

Figure 10:
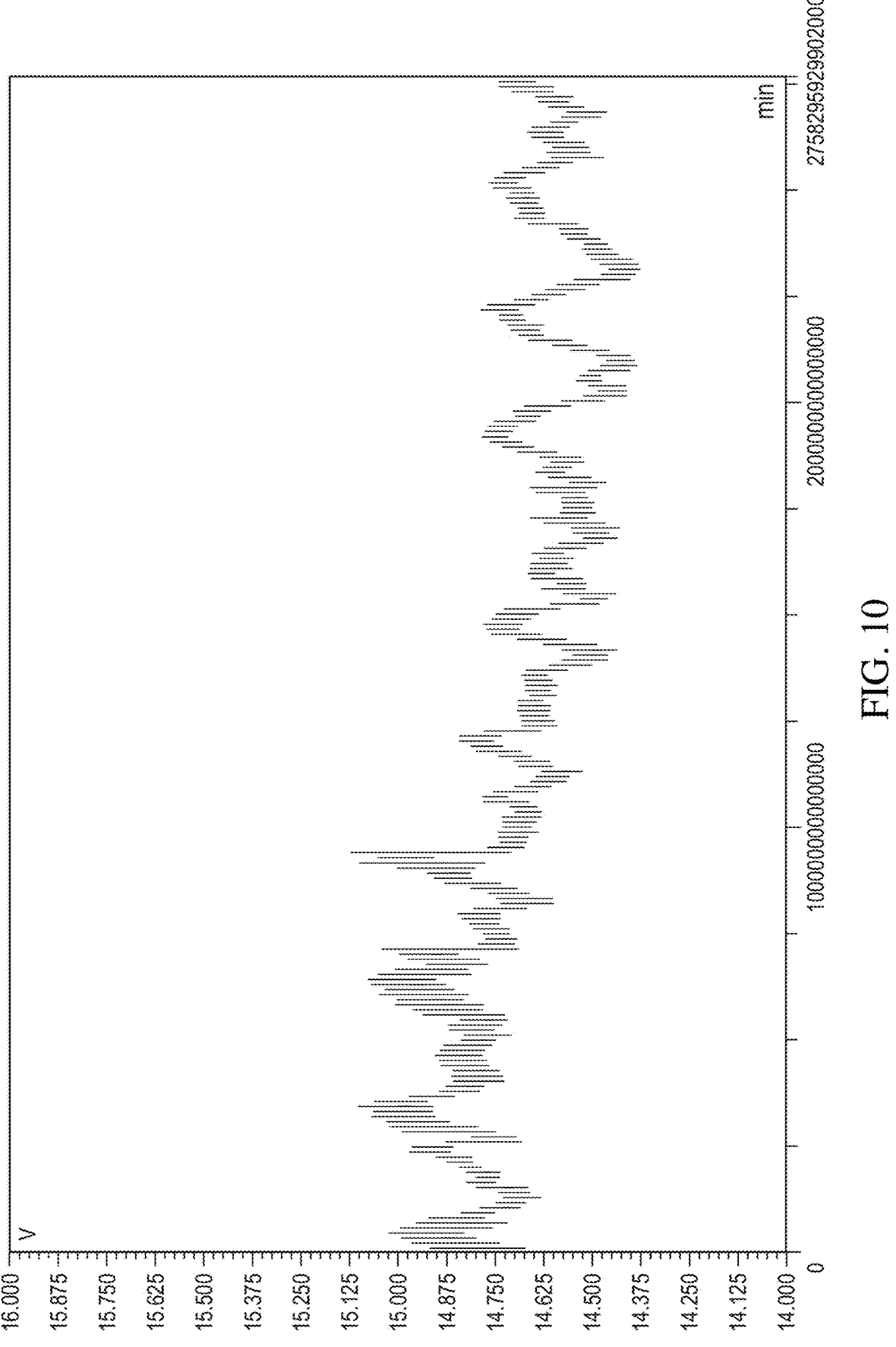
FIG. 10 illustrates the operating voltage profile for an electrolytic KOH generator with PEEK membrane compression block parts modified using an oxygen plasma.

FIG. 10 shows a typical operation voltage profile obtained for an electrolytic KOH eluent generator using the PEEK membrane compression block parts modified with an oxygen plasma, under the conditions of 1.5 mL/min, 60 mM KOH, 3995 psi, the device operating voltage is stable, ranging from 14.5 V to 15.5 V during 10 days of continuous operation. That is, the voltage remains within a range of about +/−0.5 V and less than 10% of the starting voltage.

Figure 11:
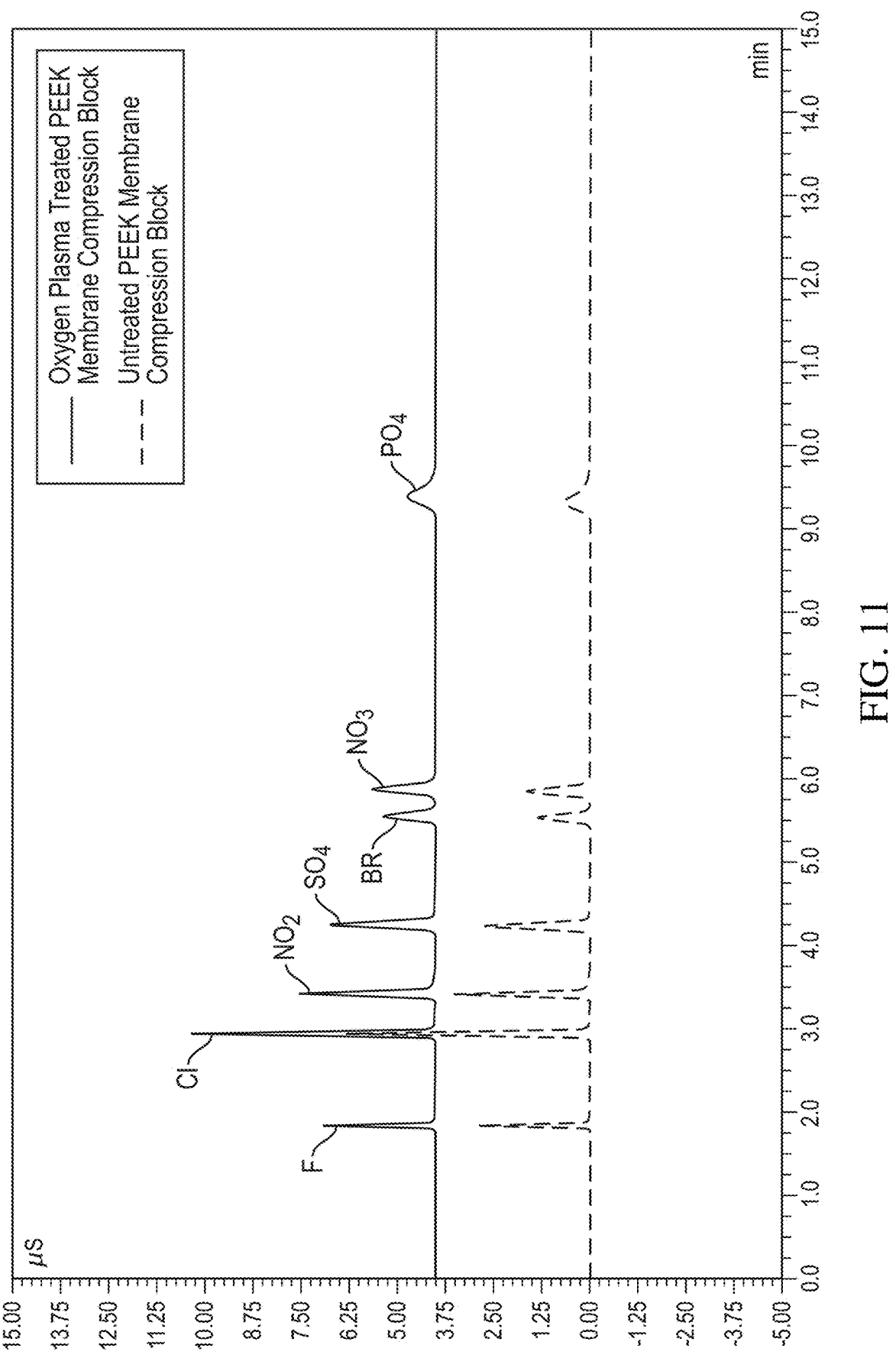
FIG. 11 illustrates separations of 7 common anions comparing the results obtained using an unmodified electrolytic KOH generator to the results using an electrolytic KOH generator with PEEK membrane compression block parts modified using an oxygen plasma.

FIG. 11 shows separations of 7 common anions (see Table 1 for anion concentrations) on an DIONEX IONPAC AS11-HC 4 μm column. The results show that identical separations were obtained using a standard DIONEX EGC 500 KOH cartridge and a modified DIONEX EGC-500 KOH cartridge assembled using the PEEK membrane compression block treated with oxygen plasma. Test conditions are 1.5 mL/min, 30 mM KOH, 4200 psi, 15 min/run, and 10 μL injections. The baselines are shifted on the y-axis to provide comparisons of the retention time and peak shape. The results indicate that the surface modification by oxygen plasma treatment does not affect the performance of an DIONEX EGC-500 KOH cartridge.

TABLE 1

Analytes for Comparison of modified
and unmodified KOH generator

| Peak | Analyte | Concentration |
|---|---|---|
| 1 | $F^-$ | 2 mg/L |
| 2 | $Cl^-$ | 10 mg/L |
| 3 | $NO_2^-$ | 10 mg/L |
| 4 | $SO_4^{2-}$ | 10 mg/L |
| 5 | $Br^-$ | 10 mg/L |
| 6 | $NO_3^-$ | 10 mg/L |
| 7 | $PO_4^{3-}$ | 20 mg/L |

Figure 12:
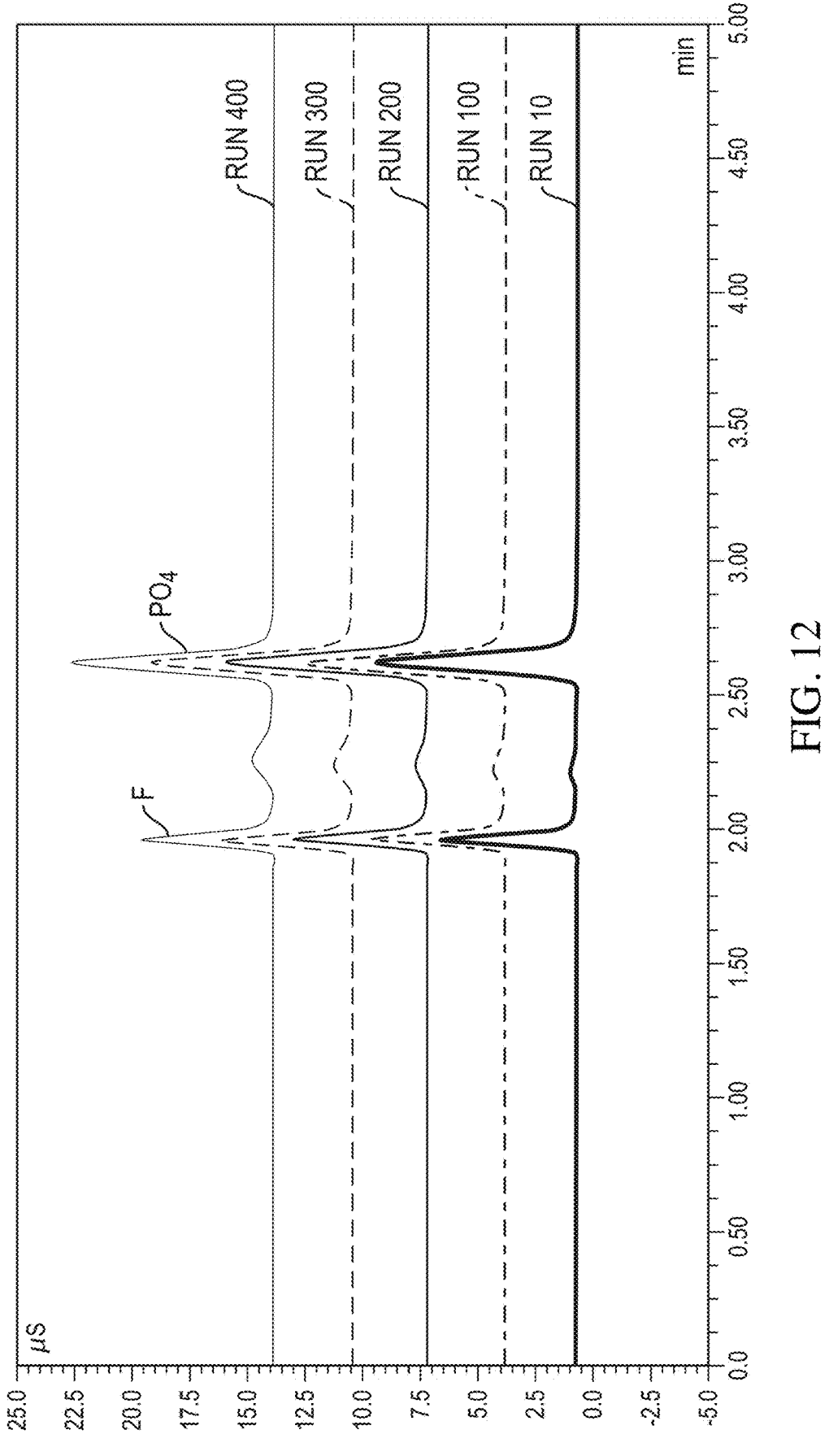
FIG. 12 illustrates the reproducibility of the separation of fluoride and phosphate using an electrolytic KOH generator with PEEK membrane compression block parts modified using an oxygen plasma.

FIG. 12 shows the separation of fluoride (2 mg/L) and phosphate (20 mg/L) on an DIONEX IONPAC AS11-HC 4 μm column obtained using an DIONEX EGC 500 KOH cartridge assembled using the PEEK membrane compression block treated with oxygen plasma. Test conditions are 1.5 mL/min, 60 mM KOH, 4350 psi, 60 min/run, and 10 μL injections. The baselines are shifted on the y-axis to provide comparisons of the retention time and peak shape. The results indicate that excellent retention time reproducibility for the target analytes were obtained over 400 consecutive runs.

Figure 13:
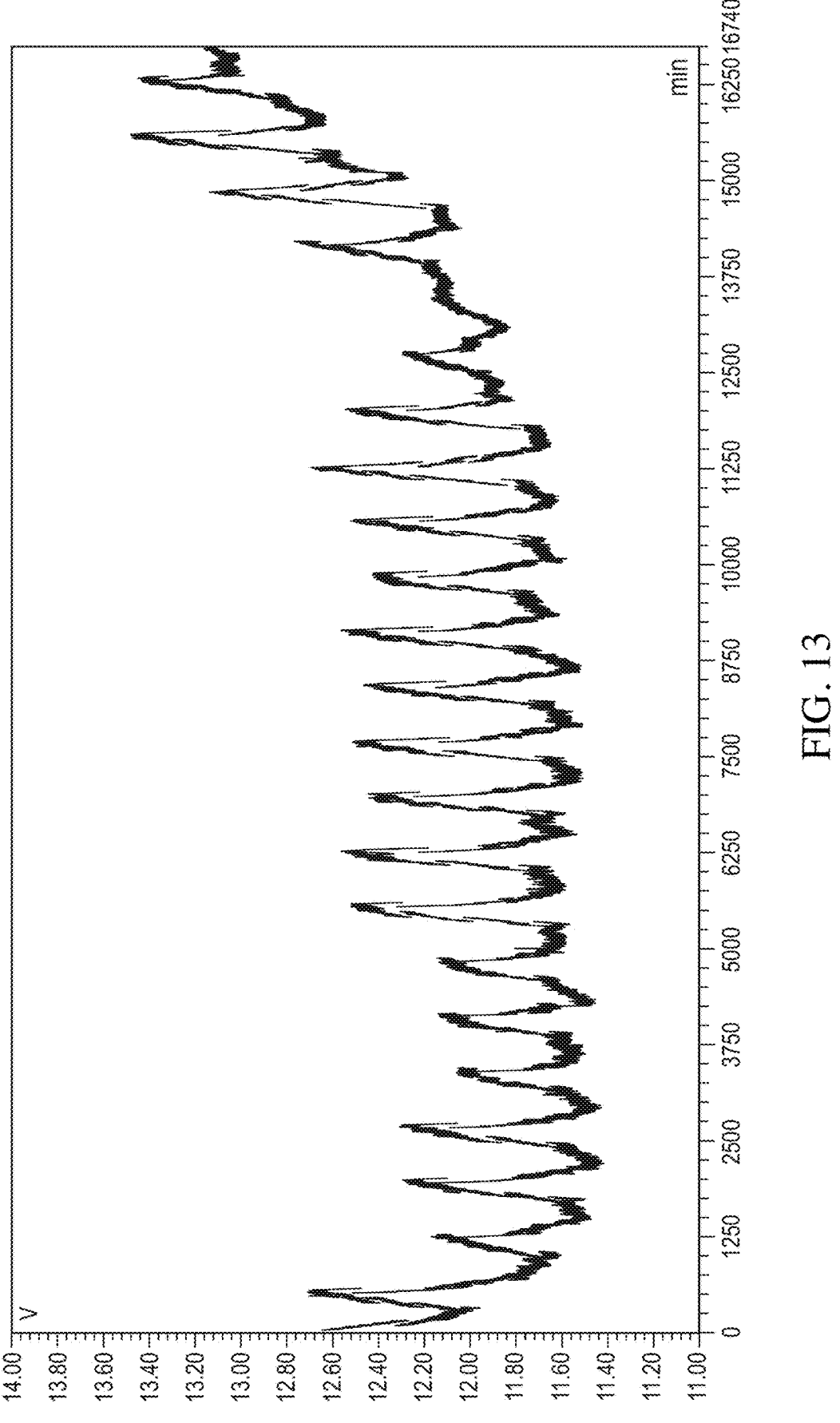
FIG. 13 illustrates the operating voltage profile for an electrolytic KOH generator with PEEK membrane compression block parts treated with TERGITOL MIN Foam.

FIG. 13 shows an overlay of operating voltages obtained for an DIONEX EGC 500 KOH cartridge assembled using the PEEK membrane compression block treated with TERGITOL MIN Foam. Under the conditions of 1.5 mL/min, 60 mM KOH, 4150 psi, the device operating voltage was stable, ranging from 11.5 V to 13.5 V during 12 days of continuous operation. That is, the voltage remains within a range of about +/−1.0 V and less than 10% of the starting voltage.

Figure 14:
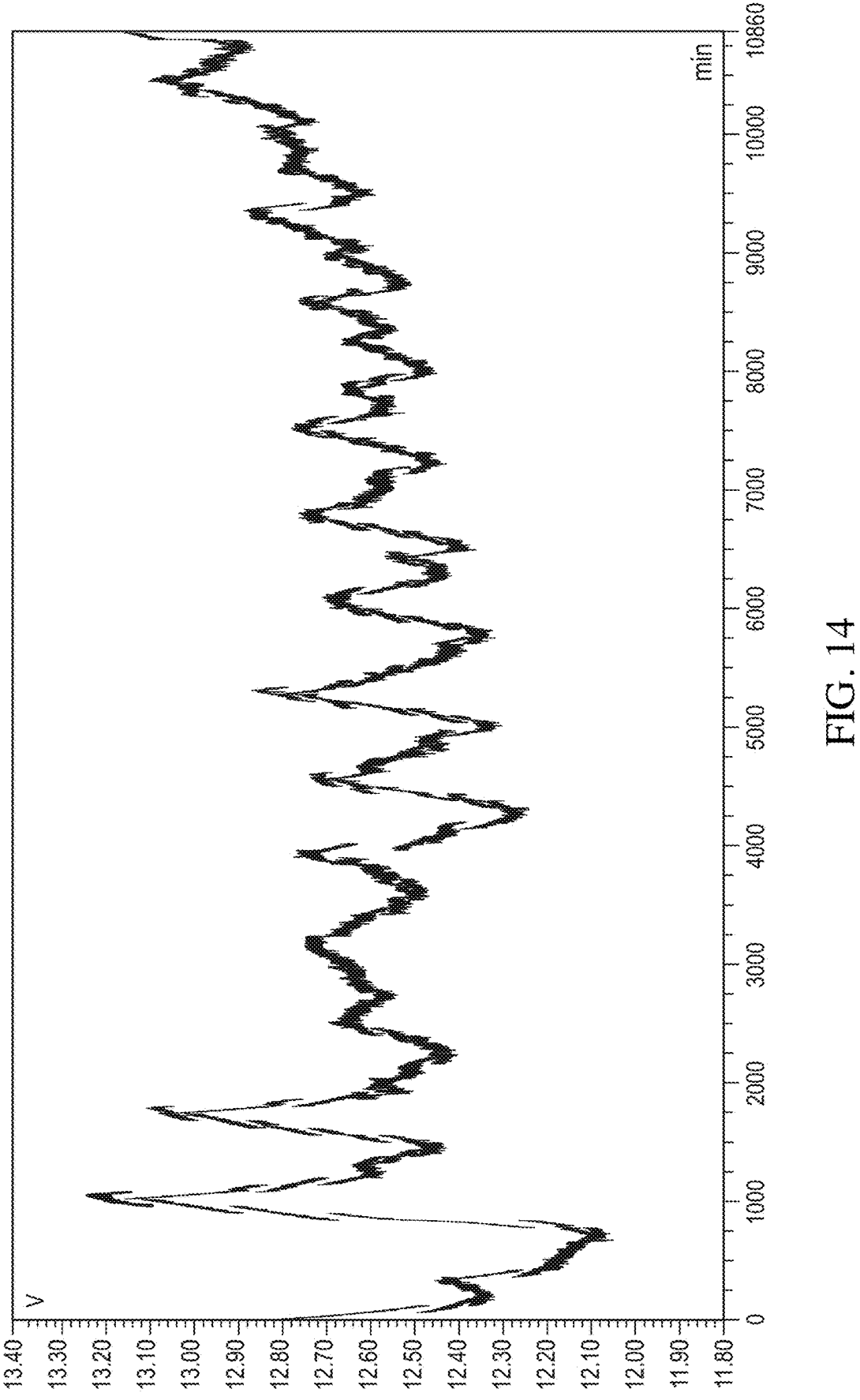
FIG. 14 illustrates the operating voltage profile for an electrolytic KOH generator with PEEK membrane compression block parts treated with TRITON H55.

FIG. 14 shows an overlay of operating voltages obtained for an DIONEX EGC 500 KOH cartridge assembled using the PEEK membrane compression block treated TRITON H55 (an anionic surfactant). Under the conditions of 1.5 mL/min, 60 mM KOH, 3950 psi, the device operating voltage was stable, ranging from 12 V to 13.4 V during 7 days of continuous operation. That is, the voltage remains within a range of about +/−1.0 V and less than 10% of the starting voltage.

What is claimed is:

1. A method comprising:
providing an aqueous electrolyte solution to an electrolyte reservoir, the aqueous electrolyte solution including an electrolyte and a surfactant, the electrolyte reservoir coupled to an eluent generation chamber by an ion exchange connector, the ion exchange connector including an ion exchange membrane stack and a compression block, the compression block having channels such that the aqueous electrolyte solution is in direct contact with the ion exchange membrane stack;
applying a voltage or current across a first electrode in the eluent generation chamber and a second electrode in the electrolyte reservoir;
electrolytically splitting water at the first electrode to form a hydroxide anion or a hydronium ion in the eluent generation chamber, wherein electrolytically splitting water results in dissolved gasses in the aqueous electrolyte solution and the surfactant, wherein the surfactant in the aqueous electrolyte solution prevents bubbles formed from the dissolved gasses from blocking the channels; and
migrating an ion from the aqueous electrolyte solution in the electrolyte reservoir through the ion exchange membrane stack to the eluent generation chamber to combine with the hydroxide anion to form a cation hydroxide solution or the hydronium ion to form an anion acid solution for ion chromatography.

2. The method of claim 1 wherein the electrolyte includes a potassium electrolyte.

3. The method of claim 1 wherein the electrolyte includes a methanesulfonate electrolyte.

4. The method of claim 1 wherein the surfactant is an anionic surfactant and the ion exchange membrane stack has a net negative charge and is configured to allow cation flow through and to block anions and bulk liquid flow or cationic surfactant and the ion exchange membrane stack has a net positive charge and is configured to allow anion flow through and to block cations and bulk liquid flow.

5. The method of claim 1 wherein the surfactant is a non-ionic surfactant.

6. The method of claim 1 wherein the surfactant is a caustic stable surfactant or an acid stable surfactant.

7. The method of claim 1 wherein the surfactant is at a concentration of between about 1 ppm and 100 ppm.

8. The method of claim 1 wherein the eluent generation chamber is at a pressure of up to about 15,000 psi.

9. The method of claim 1 wherein the current across the anode and the cathode results in a voltage that remains within a range of not greater than about +/−2.0 V over at least 7 days.

10. The method of claim 1 wherein the current across the anode and the cathode results in a voltage that varies by not more than 10% of a starting voltage over at least 7 days.

* * * * *